(12) United States Patent
Mühlenbrock et al.

(10) Patent No.: US 8,205,946 B2
(45) Date of Patent: Jun. 26, 2012

(54) ACTUATOR

(75) Inventors: Ludger Mühlenbrock, Recklinghausen (DE); Jörg Seibt, Cologne (DE)

(73) Assignee: Johnson Controls GmbH, Burscheid (DE)

( * ) Notice: Subject to any disclaimer, the term of this patent is extended or adjusted under 35 U.S.C. 154(b) by 82 days.

(21) Appl. No.: 12/531,636

(22) PCT Filed: Mar. 11, 2008

(86) PCT No.: PCT/EP2008/001913
§ 371 (c)(1),
(2), (4) Date: Mar. 9, 2010

(87) PCT Pub. No.: WO2008/113491
PCT Pub. Date: Sep. 25, 2008

(65) Prior Publication Data
US 2010/0164269 A1    Jul. 1, 2010

(30) Foreign Application Priority Data

Mar. 16, 2007 (DE) .......................... 10 2007 013 380
Aug. 7, 2007 (DE) .......................... 10 2007 037 138

(51) Int. Cl.
*B60N 2/20* (2006.01)
(52) U.S. Cl. ............ 297/361.1; 297/378.12; 297/378.14
(58) Field of Classification Search ............. 297/344.11, 297/361.1, 378.12, 378.14
See application file for complete search history.

(56) References Cited

U.S. PATENT DOCUMENTS

| 3,958,828 A * | 5/1976 | Ishida et al. ............... 297/361.1 |
| 5,058,240 A | 10/1991 | Barda et al. |
| 5,261,725 A * | 11/1993 | Rudolph ................... 297/361.1 |
| 5,407,165 A | 4/1995 | Balocke |
| 5,733,008 A | 3/1998 | Tame |
| 5,927,809 A * | 7/1999 | Tame ................... 297/344.11 X |
| 6,139,105 A | 10/2000 | Morgos et al. |
| 6,629,710 B1 | 10/2003 | Shafry |
| 6,767,063 B1 | 7/2004 | Abdella et al. |
| 6,799,801 B2 * | 10/2004 | Niimi et al. ............... 297/378.12 |
| 6,827,404 B2 * | 12/2004 | Blair et al. ............... 297/378.12 |
| 6,832,815 B2 * | 12/2004 | O'Connor ............... 297/378.12 |

(Continued)

FOREIGN PATENT DOCUMENTS

DE   8619457 U1   10/1986

(Continued)

OTHER PUBLICATIONS

Patent Treaty Cooperation, International Search Report, PCT/EP2008/001913, Jul. 8, 2008.

(Continued)

*Primary Examiner* — Rodney B White
(74) *Attorney, Agent, or Firm* — Butzel Long

(57) ABSTRACT

The present application relates to an actuating device (1) having a drive part (2) moving an output part (5) from an initial position into a final position, wherein the output part (5), or the drive part (2), has a first region (9) and a second region (10), and the drive part (2), or the output part (5), interacts with the two regions (9, 10) such that the position of the output part (5) is changed during an interaction with the first region (9), and an interaction with the second region (10) prevents a return movement of the output part (5) into the initial position. The present invention further relates to a vehicle seat comprising the actuating device (1) according to the application.

12 Claims, 3 Drawing Sheets

U.S. PATENT DOCUMENTS

| | | | |
|---|---|---|---|
| 6,926,362 B2 * | 8/2005 | Kroner et al. | 297/378.12 X |
| 7,021,716 B2 * | 4/2006 | Persad et al. | 297/378.12 |
| 7,494,186 B2 * | 2/2009 | Paing et al. | 297/378.12 |
| 7,517,022 B2 * | 4/2009 | Habedank et al. | 297/378.12 |
| 7,631,936 B2 * | 12/2009 | Fukukawa et al. | 297/361.1 X |
| 7,926,875 B2 * | 4/2011 | Schmale | 297/344.11 |
| 2001/0030456 A1 | 10/2001 | Biletskiy | |
| 2002/0050733 A1 | 5/2002 | Hansel et al. | |
| 2002/0153755 A1 | 10/2002 | Sugimoto | |
| 2003/0127898 A1 * | 7/2003 | Niimi et al. | 297/378.12 X |
| 2003/0189372 A1 | 10/2003 | Shephard | |
| 2005/0212338 A1 | 9/2005 | Muller et al. | |
| 2005/0218685 A1 | 10/2005 | Liu et al. | |
| 2007/0080554 A1 | 4/2007 | Willing et al. | |
| 2007/0216171 A1 | 9/2007 | Haida | |
| 2009/0200849 A1 | 8/2009 | Schmale | |

FOREIGN PATENT DOCUMENTS

| | | |
|---|---|---|
| DE | 10025606 A1 | 5/2000 |
| DE | 10025606 A1 | 12/2001 |
| DE | 102004038587 A1 | 2/2006 |
| EP | 0589759 A1 | 3/1994 |
| WO | WO2004069585 A | 8/2004 |
| WO | 2005097544 A1 | 10/2005 |
| WO | WO2005097544 A | 10/2005 |

OTHER PUBLICATIONS

Deutsches Patent—Und Markenamt, Search Report, DE102007037138, May 27, 2008.

* cited by examiner

ACTUATOR

CROSS REFERENCE TO RELATED APPLICATIONS

The present application is a U.S. National Stage filing of International Application No. PCT/EP2008/001913, filed on Mar. 11, 2008, titled "ACTUATING DEVICE, PARTICULARLY FOR A VEHICLE SEAT" which claims priority to German Patent Application No. DE 10 2007 013 380.6 filed Mar. 16, 2007, and German Patent Application No. DE 10 2007 037 138.3 filed Aug. 7, 2007, and the entire disclosures of which are incorporated herein by reference.

BACKGROUND

The present disclosure relates to an actuating device with a drive part which moves an output part from an initial position into a final position. More particularly, the present disclosure relates to a vehicle seat having the actuating device according to the disclosure.

Actuating devices are generally know such as, for example, the actuator disclosed in U.S. Pat. No. 6,629,710 B1, to Shafry et al., issued Oct. 7, 2003. The actuating device disclosed there relates to a device for use in reversibly locking the vehicle seat to the motor vehicle body. Another prior art is Germany Gebrauschmuster DE 8 619 457 U1, published Dec. 11, 1986 which relates to an electric rocker switch.

SUMMARY

The present disclosure, in one exemplary embodiment, relates to an actuating device in which angular deviations in the rotational position of the drive part caused by tolerances and/or, for example, by a tumbling mechanism are at least not entirely transmitted to the final position of the output part.

The actuating device of the exemplary embodiment, includes a drive part which moves an output part from an initial position into a final position, wherein the output part or the drive part has a first region and a second region, and one of the drive part and the output part interacts with the two regions to change the position of the output part upon interaction with the first region, and upon an interaction with the second region to prevent the output part from moving back into the initial position.

The actuating device of the exemplary embodiment is designed such that angular deviations in the rotational position of the drive part caused by tolerances and/or by a tumbling mechanism are at least not entirely transmitted to the final position of the output part. As a result, the movement of the output part is neither too short nor too long, and therefore the desired final position thereof is reliably reached and the output part is prevented from moving too far and being damaged as a result. Further, in one exemplary embodiment components arranged downstream are also prevented from being adversely affected.

The actuating device of the exemplary embodiment, or components with which it interacts, can be produced more favorably and/or simply because greater manufacturing tolerances are permissible. In addition, the actuating device according to the invention can be combined with different subassemblies, such as, for example, tumbling mechanisms, from what is possible in the case of actuating devices according to the prior art.

In one exemplary embodiment, the actuating device has a drive part, and in one alternate exemplary embodiment the drive part is preferably a rotary part, and in particular a rotary lever or a cam.

In one exemplary embodiment, the drive part drives an output part. The drive part preferably interacts at one end thereof which is spaced apart from the axis of rotation of the output part. Furthermore, in one exemplary embodiment, the output part takes up at least two positions, namely an initial position and a final position, the output part preferably being in the initial position before it has been driven by the drive part. When the drive part is then driven, the output part is transferred by the drive part from the initial position and into the final position. For this purpose, the output part or the drive part preferably has two regions. In the first region, the output part is transferred by the drive part from the initial position into the final position. In the second region, only a movement of the output part back into the initial position is prevented. In the second region, the drive part can accordingly move and interact with the output part without moving the output part at the same time. The second region accordingly makes it possible for the drive part to move, for example to rotate, without the output part being moved further at the same time and being damaged as a result. The second region accordingly preferably has a shape which corresponds to the rotational movement of that part of the drive part which interacts with the drive part. If the drive part executes, for example, a rotational movement, the second region is preferably configured in the shape of a circular arc.

In one exemplary embodiment, the drive part and/or the output part are preferably rotary elements, for example rotary levers.

In one exemplary embodiment, the drive part and/or the output part preferably have elements, for example spring elements, which return the drive and/or output parts case into their respective initial position.

In one exemplary embodiment, the first and the second region are preferably arranged directly adjacent on the drive part or output part.

In one exemplary embodiment, the actuating device is suitable in particular for adjusting and/or locking a vehicle seat.

In one exemplary embodiment, a vehicle seat provides space for one or more individuals. Accordingly, the vehicle seat may also be a bench seat. The vehicle seat is to be arranged in a vehicle, preferably a motor vehicle. In one exemplary embodiment, a second seat is also preferably arranged behind, (with reference to the forward direction of travel of the vehicle) the vehicle seat having an adjusting device as disclosed herein.

In one exemplary embodiment, all functions of the vehicle seat can be actuated with the actuating device. However, the actuating device preferably interacts with another adjusting and/or locking mechanism. In one exemplary embodiment, the actuating device preferably interacts with the locking mechanism of an easy-entry device and function of the vehicle seat. In one exemplary embodiment, the drive part is preferably a part of the back rest or, alternatively, can be driven by the back rest such that, when the back rest is pivoted relative to a seat part of the vehicle seat, a locking mechanism between the vehicle seat and the vehicle body can be released and the entire vehicle seat can be moved along a rail into the easy-entry position which permits easier entry of the occupants, for example, to the rear bench seat of a motor vehicle behind the vehicle seat including the adjusting device of the exemplary embodiments.

In one exemplary embodiment, the position of the back rest of the vehicle seat relative to the base (or seat part) of the vehicle seat can preferably be adjusted. The adjustment of the back rest particularly preferably takes place with a "recliner" mechanism that is arranged between the back rest and the seat part. In one exemplary embodiment, the recliner mechanism is a "tumbling recliner" type. In one exemplary embodiment, the actuating device is particularly valuable when a tumbling recliner is used because, in the case of the tumbling recliner, the axis of rotation of the tumbling recliner mechanism moves or changes between the back rest and the seat part. Despite these changes, the actuating device of the exemplary embodiments a ensures that the output part reaches the final position thereof but is not rotated there beyond.

The exemplary embodiments of the adjusting device are explained below with reference to FIGS. 1 through 3. The explanations of the exemplary embodiments are merely by way of example and do not restrict the general inventive concept.

SUMMARY

Figure 1:
FIG. 1 shows an actuating device according to an exemplary embodiment located in seven sequenced positions.

Referring generally to all of the Figures, in one exemplary embodiment, there is shown an actuating device 1 including a driving, lever-like rotary element 2 which is rotatable about an axis 3. Upon actuation of the actuating device, the free end 4 of the driving element 2 executes a rotation, as illustrated by arrow A in FIG. 1, and acts upon a pivotable or rocker-like, output rotary element 5. The output element 5 is rotatable about an axis 6 aligned parallel to the axis 3 of the driving element 2 and the output element 5 is pivoted in the direction of the arrow B from an initial position (shown at 0 degrees, position No. 1 in FIG. 1) toward and eventually into a final position (position Nos. 4 through 7 in FIG. 1). At one end 7 facing away from the rotary element 2, the rotary element 5 executes, as a function of the rotary position thereof, an operation on an adjusting or locking device, for example on a vehicle seat back 8 of a vehicle seat as best shown in FIG. 2.

In one alternative exemplary embodiment, it would be understood by a person skilled in the art that the operation of the actuating device can be reversed such that the rotary element 5 could function as the drive part and the rotary element 2 could function as the output part.

During the rotation thereof (such as shown by arrow A in FIG. 1), the free end 4 of the rotary element 2 executes a movement along a circular path which runs proportionally to the rotation of the axis 3. During this process, angle errors in the position of the rotary element 2 continuously bring about an erroneous position of the end 4 of the rotary element 2. These positional (angle) errors can be caused by tolerances in the parts, but also by a changing position of the axes of rotation 3 and/or 6. The change in the position of the axis of rotation may be caused by the use of, for example, a tumbling recliner mechanism. Nevertheless, to reach a precisely defined final position, the contact region of the rotary element 5 with the free end 4 of the rotary element 2 has a rectilinear, first region 9 facing generally away from the axis of rotation 6 of the rotary element 5 and the contact region of the rotary element 5 has an adjoining, second region 10 which faces generally faces toward the axis of rotation 6 and has a profile in the shape of a circular arc. The contour of the second region 10 corresponds to the path of movement of the free end 4 of the rotary element 2, but, in the initial position of the actuating device (as shown at an angle of rotation 0° at position 1 in FIG. 1), the second region 10 is offset in the direction of the axis of rotation 3.

Figure 2:
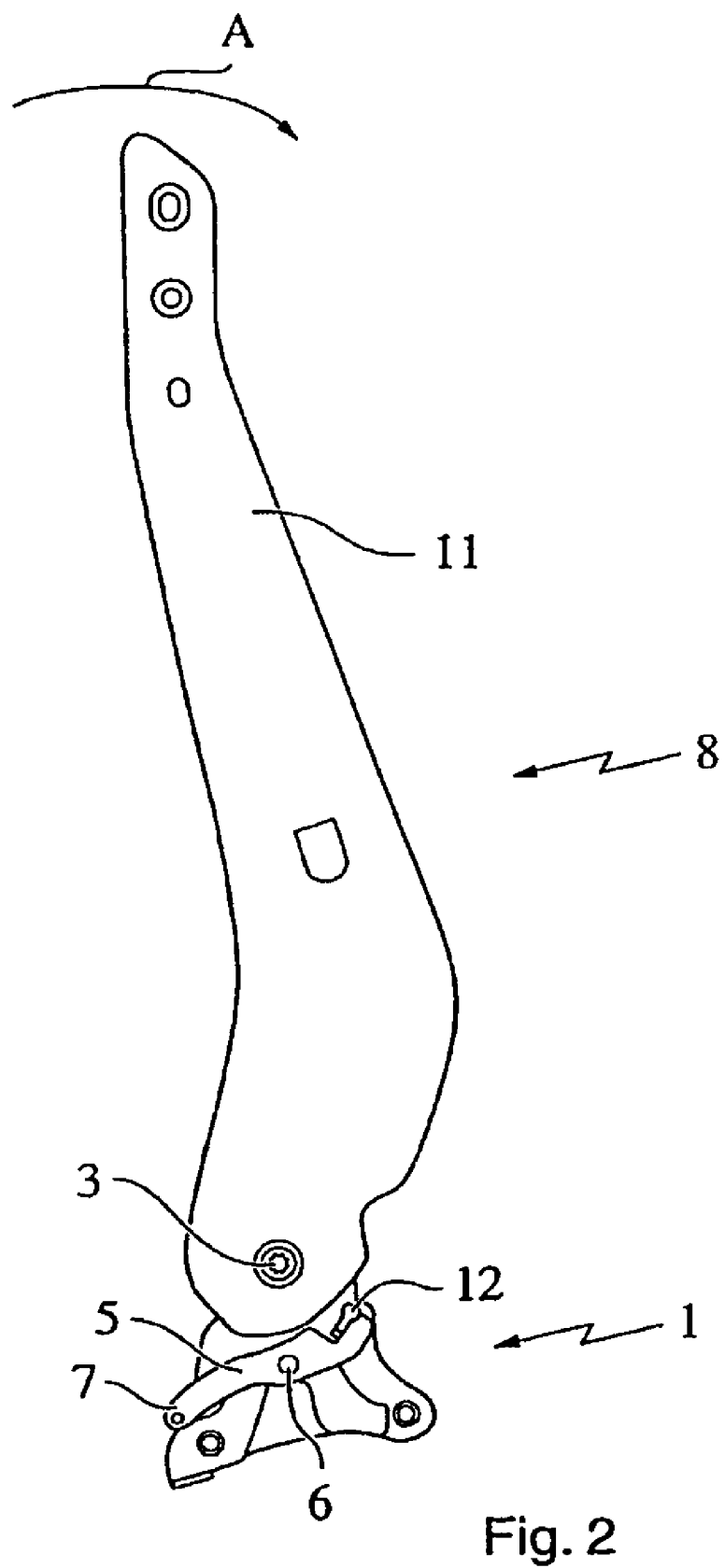
FIG. 2 shows a side view of the seat back of the vehicle seat including the actuating device according an exemplary embodiment.

When the rotary element 2 is actuated (i.e., rotated), such as between the angles of rotation of 0° to 30° in the exemplary embodiment of FIG. 1, first of all the rotary element 2 drives the output rotary element 5 to be rotated in the direction of the arrow B (as shown in FIG. 1), with positional errors of the rotary element 2 being transmitted to the output element 5. As soon as the free end 4 of the driving element 2 reaches the transition from the first region 9 to the second region 10 of the output element 5, as shown at an angle of rotation of a limit position of about 30° (as best shown at position No. 4 in FIG. 1), the second region 10 is aligned precisely along the further path of movement of the free end 4. Therefore, further changes in the angle of rotation, here from about 30° to about 60° (as best shown at positions Nos. 4-7 in FIG. 1), the output rotary element 2 no longer results in the output rotary element 5 being rotated. Accordingly, while the free end 4 traces along the second region 10, the output element 5 will only operate to merely prevent the driving rotary element 2 from rotating back into the initial position. Within the angular range of the second region 10, the output rotary element 5 therefore always takes up the same rotary position relative to the adjusting or locking device of the vehicle seat 8.

The angle details and positions shown in FIG. 1 correspond to the angle positions of the seat back rest such as in an easy-entry function. The seat back rest is rotated forward through approx. 60° from a substantially vertical position.

Importantly, movement of the driving rotary element 2 results only over a subregion of its path of movement in a movement of the output rotary element 5, and when a limit position is exceeded, only enables the output rotary element 5 to rotate back. As a result, the rotary element 5 is always rotated into a precisely defined final position.

Figure 3:
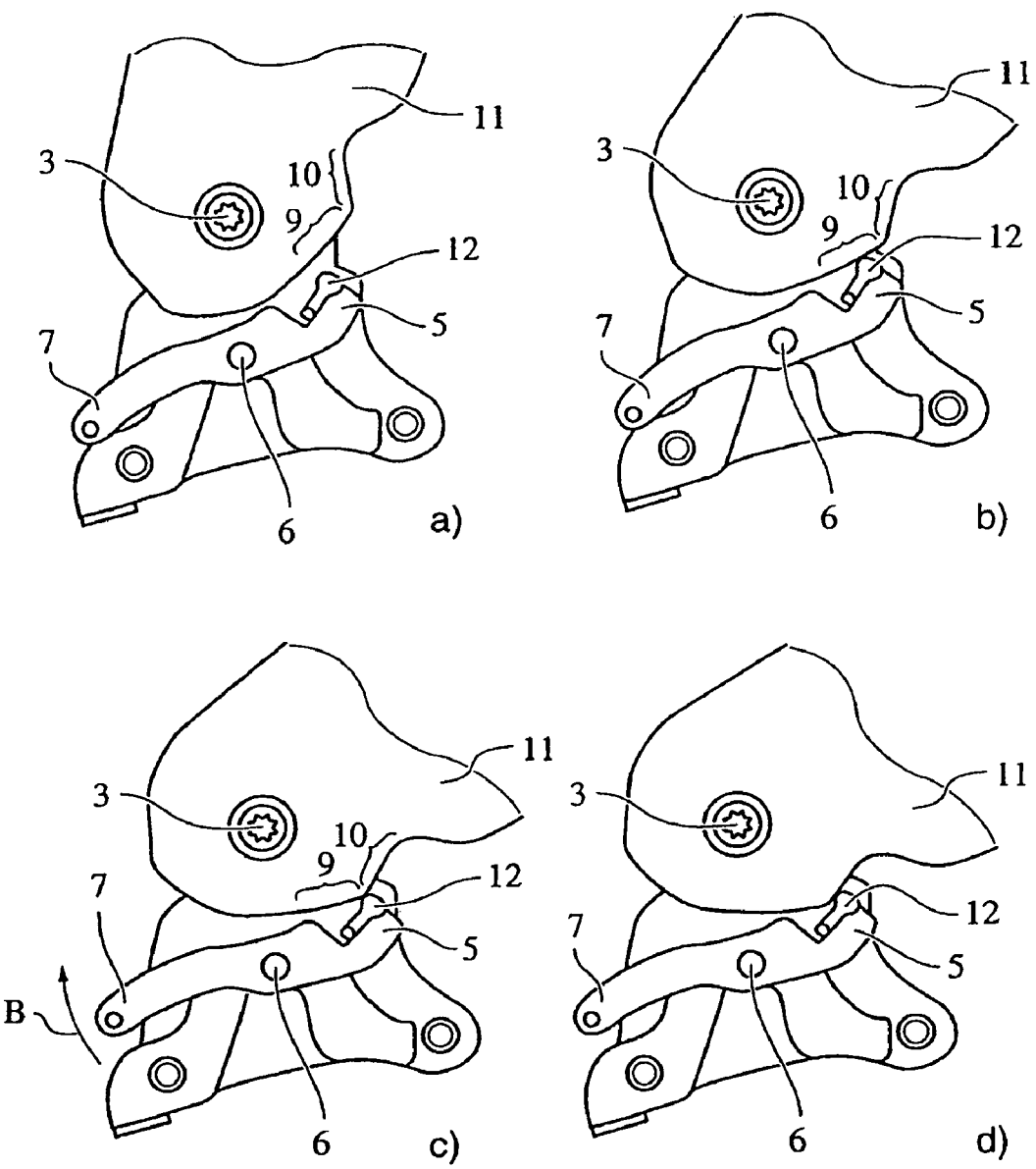
FIGS. 3a) through 3d) show a partial view of the seat back of the vehicle seat including the adjusting device located in the region of the recliner mechanism according to an exemplary embodiment.

FIGS. 2 and 3 show a vehicle seat back 11 to be used in a vehicle seat, the vehicle seat back 11 including an actuating device 1 in one exemplary embodiment. The vehicle seat is equipped with an easy-entry function which serves to release a rail lock (not shown) when the back rest 11 is folded forward (in the direction of arrow A as shown in FIG. 2).

The actuating device 1 includes the driving rotary element 2 incorporated (or integrated) in the back rest 11 which is rotatable about an axis 3. In this embodiment, the outer contour of the back rest 11 acts on a sliding component 12 of the output rotary element 5 which can be pivoted about the axis 6 and is operatively connected, such as by a Bowden cable fastened to the free end 7, to the rail lock (not shown).

Referring now in particular to FIG. 3, an alternate exemplary embodiment of the actuating device 1 is shown in an initial position (angle of rotation 0°, where the seat back rest 11 is upright as best shown in FIG. 3a)), wherein the outer contour of the back rest 11, which function corresponds to the free end 4 of the actuating device 1 design shown in the embodiment of FIG. 1, is not in contact with the sliding component 12 (see FIG. 3a). This occurs when the seat back rest 9 is folded forward about an angle of rotation of 23° (as best shown in FIG. 3b)). The sliding component 10 slides from there, initially with the rotary output element 5 being rotated along the first region 9, until the outer contour of the seat back rest 11 merges into the second region 10 where the limit position is reached (as shown FIG. 3c), where there is an angle of rotation of about 38°). The limit position is the desired final position of the rotary output element 5. Further pivoting of the seat back rest 11 forward (here up to about 48°, as best shown in FIG. 3d)) does not result in any further rotation of the rotary output element 5. The adjusting travel is transmitted from the Bowden cable (not shown) to the rail lock (or other device or actuator not shown) is therefore unchanged between an angle of rotation of about 38° and about 48°. This travel limiter prevents damage, such as tearing, of the Bowden cable or damage to subassemblies connected to the Bowden cable.

The invention claimed is:

1. An actuating device, comprising:
 a drive part,
 an output part which is moved by the drive part from an initial position into a final position, wherein one of the output part and the drive part has a first region and a second region, and the other of the drive part and the output part interacts with the first and second regions, the position of the output part changing upon interaction of the drive part with the first region; and
 wherein the position of the output part does not change upon interaction of the drive part with the second region of the output part and the drive part prevents the output part from moving back toward the initial position.

2. The actuating device of claim 1 wherein the drive part and the output part are rotary elements and each has a respective axis of rotation.

3. The actuating device of claim 1 wherein the first and second regions are located on the ouput part directly adjacent one another.

4. The actuating device of claim 1 wherein the actuating device is coupled to a vehicle seat to operate the position of a seat back with respect to a seat base.

5. The actuating device of claim 4 wherein the actuating device interacts with at least one of an adjusting and a locking mechanism of the vehicle seat.

6. The actuating device of claim 5 wherein the actuating device interacts with a locking mechanism of an easy-entry mechanism of the vehicle seat such that when the seat back of the vehicle seat is rotated beyond a point, the output part maintains its position as the seat back continues to be rotated.

7. The actuating device of claim 5 wherein the drive part is part of the seat back rest.

8. The actuating device of of claim 7 wherein the vehicle seat includes a tumbling recliner mechanism coupled between the seat back rest and the seat base part for moving the seat back rest relative to the seat base part.

9. A vehicle seat having an actuating device, comprising:
 a drive part coupled to a rotatable seat back of the vehicle seat, the drive part having an axis of rotation aligned with the axis of rotation of the seat back;
 an output part having an axis of rotation aligned parallel with and located distal from the axis of rotation of the drive part, the output part being movable by the drive part from an initial position and toward a final position, wherein one of the output part and the drive part has a first region and a second region, and the other of drive part and the output part interacts with the first and second regions, the position of the output part changing upon interaction of the drive part with the first region and the position of the output part not changing upon interaction of the drive part with the second region of the output part and wherein the drive part prevents the output part from moving back toward the initial position when the drive part is interacting with the second region.

10. The vehicle seat of claim 9 wherein the first and second regions are located on the output part and placed directly adjacent one another.

11. The vehicle seat of claim 9 wherein the first region of the output part has a generally rectilinear shape and faces in a direction substantially away from the axis of rotation of the output part and the second region of the output part has a generally arcuate shape and faces in a direction substantially toward the axis of rotation of the output part.

12. The vehicle seat of claim 11 wherein the second region of the output part has a generally constant radius arcuate shape.

* * * * *